April 9, 1963     J. F. KLAPPROTH     3,084,511
WAVE TYPE PRESSURE EXCHANGER WITH OVERALL PRESSURE RISE
Filed Aug. 26, 1960
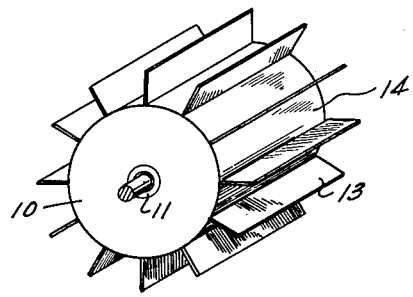
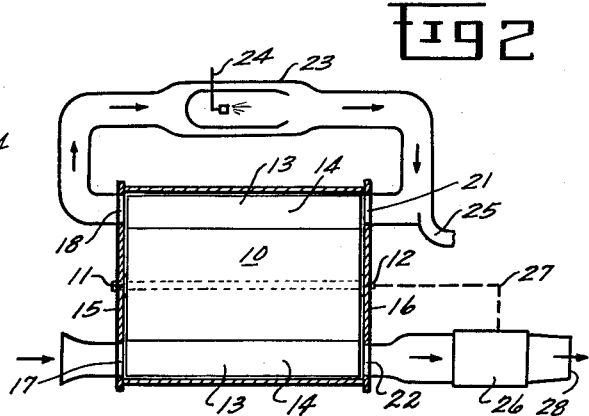
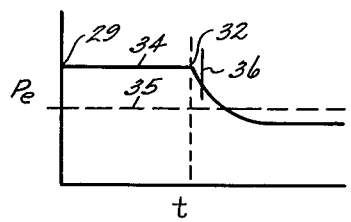
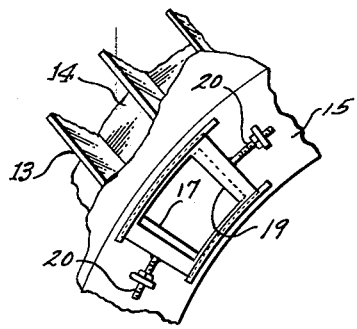
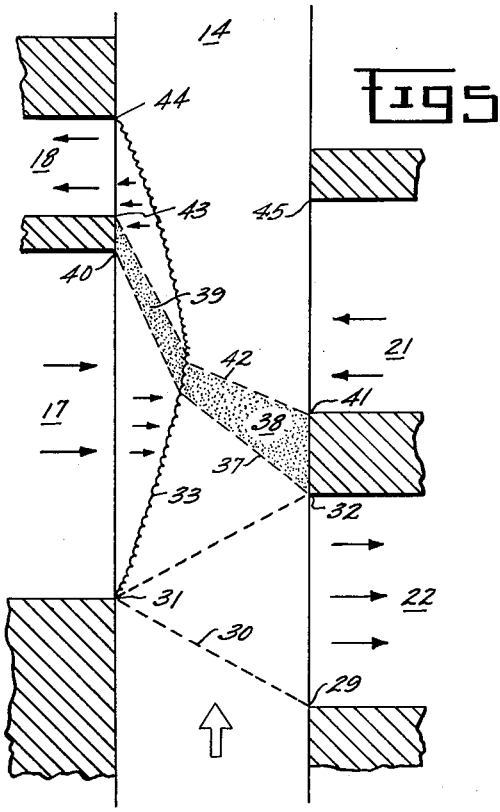
*INVENTOR.*
JOHN F. KLAPPROTH
BY
ATTORNEY United States Patent Office 3,084,511
Patented Apr. 9, 1963

3,084,511
WAVE TYPE PRESSURE EXCHANGER WITH OVERALL PRESSURE RISE
John F. Klapproth, Cincinnati, Ohio, assignor to General Electric Company, a corporation of New York
Filed Aug. 26, 1960, Ser. No. 52,111
3 Claims. (Cl. 60—39.45)

The present invention relates to an inflow wave engine with an overall pressure rise and, more particularly, to a pressure exchanger or "wave engine" type of device in which the exhaust output gas is at an essentially constant and time steady pressure and at a higher pressure than the input gas to the device.

The fluid flow device of the present invention is a pressure exchanger or more popularly known as a "wave engine" which may perform the function of a normal compressor turbine set for compressing a gas such as air from a lower to a higher pressure by direct utilization of the energy from a high pressure hot fluid. It may be used in a great variety of devices wherever higher compressed gas is required and especially where heat is added externally of the heat of compression. The compression is accomplished by pressure waves within the wave engine and, except for a rotor, no moving parts are required. A typical use may occur in a reaction engine such as a turbojet wherein the wave engine may replace the compressor, combustion and turbine sections with a much simpler structure that is less expensive to construct. Alternately, it may replace parts of the compressor, the combustion section, and parts of the turbine depending on the particular type of engine with which it is used. Such pressure exchangers or wave engines are known and a typical one is illustrated in the U.S. patent to Claude Seippel, Number 2,399,394, which is the general type of device herein defined. It is this type of device which the instant invention improves upon.

The advantage of the wave engine is that it can be built at an appreciably lower cost than the usual cost of an equavalent axial flow compressor and turbine set with all its expensive blading. If used to replace part of the turbine stages, it has the same advantage in reducing the number of expensive parts required. In addition, the wave engine promises higher cycle pressure ratios and higher temperatures than currently available with known systems. The higher temperatures are obtainable since the gas from the combustor does not flow directly to the turbine but can be cooled within the wave engine so that higher operating temperatures are available without the limiting turbine temperatures being a drawback. When it is used in combination with a single spool supercharging compressor it permits higher cycle pressure ratios than are available from a single spool. When used as a substitute for the second spool of a dual spool type of engine, it offers considerable savings in the type and complexity of the hardware required. The potential use of the high pressure ratio, high temperature cycles available by combining the wave engine with conventional turbomachinery offers an improvement in specific fuel consumption (SFC) over the conventional engines using turbomachinery alone. This is done with a saving of much of the blading of the current engines as well as permitting configurations shorter in length and lighter in weight.

One of the problems that has restricted application of the wave engine with turbomachinery has been that the discharge is neither time steady nor circumferentially uniform. Heretofore, the non-steady non-uniform flow has adversely affected the performance of the turbine or other pieces of machinery which may use the exhaust of the wave engine. In addition, it has been necessary to extract the useful energy from the system by bleeding off a portion of the high pressure gases, resulting in a split flow path or by extracting power at the maximum pressure and temperature levels before the gas is returned to the wave rotor. Previous configurations required that the exhaust pressure be equal to or less than the inlet pressure.

In order to simplify the gas flow path and to reduce the temperature levels in the high speed turbines it is desirable to have the useful work of the wave engine available in the form of a high pressure exhaust consisting of the total flow through the machine. The excess energy may then be extracted by a turbine downstream of the wave engine exhaust or by other energy extracting means. At the same time a single flow path is maintained wherein heat addition takes place. In other words, if the exhaust from the wave engine can be obtained at a steady flow and higher pressure than the inlet, it is possible to use the turbine at the exhaust of the wave engine to simplify the installation. When the energy has to be extracted elsewhere in the system, it is necessary to use additional turbomachinery at the extraction point as well as at the exhaust from the wave engine, thus duplicating the machinery required, and generally resulting in split flow paths, both adding to cost and performance loss in the system. By the present invention split flows can be avoided with the complex problems encountered in subsequent mixing of different flows.

The main object of the present invention is to provide a time steady fluid flow device of the wave engine type which provides a substantially constant pressure exhaust therefrom.

A further object is to provide such a steady flow device which uses a closed cycle external loop heat addition system to avoid split flows and subsequent mixing. It is possible to bleed flow or extract energy from the high pressure closed loop in the present system and still maintain the steady flow output from the wave engine.

Another object is to provide such a fluid flow device which gives a net total pressure rise across the device.

Another object is to provide such a device which carries out the above objects by a novel timing sequence of the rotor cycle.

Briefly stated, the fluid flow device of the instant invention comprises a rotor that may be driven by its own reaction or by an external source and which rotor has a plurality of cells around its periphery to permit flow lengthwise through the rotor. A stator mechanism at each end of the rotor has inlet and outlet ports for the passage of fluid such as gas through the cells. Valve control edges on the ports time the admission and exit of the gas so that the exhaust is at a higher pressure than the inlet to the cells and further, is essentially a steady pressure exhaust.

While the specification concludes with claims particularly pointing out and distinctly claiming the subject matter which I regard as my invention, it is believed the invention will be better understood from the following description taken in connection with the accompanying drawing in which:

FIGURE 1 is a perspective view of the wave engine rotor;

FIGURE 2 is a schematic view of the rotor and the system in which it is employed;

FIGURE 3 is a plot of the exhaust pressure versus time showing the cut-off point by the timing in the instant invention;

FIGURE 4 is a schematic showing of one form of valve control edge mechanism for adjustment, and;

FIGURE 5 is a developed schematic view on a large scale of the flow process in a single rotor cell.

Referring first to FIGURE 1 there is shown a rotor of a typical wave engine. It consists of a preferably cylindrical rotor 10 which may be hollow to reduce weight and is mounted for rotation on bearings 11 and 12 (see FIGURE 2). Mounted on the periphery of the rotor is a plurality of upstanding fins 13 that are peripherally spaced from one another a suitable distance to define a cell 14 therebetween. The rotor may be shrouded or unshrouded as shown. The fins 13 may be simple straight-sided axially extending parallel fins as shown or may take different configurations as desired. To permit the free flow of fluid, hereinafter referred to as gas, through the cells, each cell 14 extends through the rotor from one end at bearing 11 to the opposite end at bearing 12 and the term axially extending cells contemplates forms of cells to permit flow lengthwise of the rotor. Thus, each cell provides a complete transverse path the length of the cell for any fluid and is open at each end of the rotor.

In order that the gas through the cells may be controlled, the rotor is mounted in a system as shown in FIGURE 2. This system comprises the rotor 10, a first stator 15 adjacent one end of the rotor and a second stator 16 adjacent the other end of the rotor. Both stators are normally fixed. Stator 15 is provided with a first low pressure cold gas inlet 17 which may receive gas, such as air, from any suitable source not shown and direct it into cell 14. Also in stator 15, and peripherally spaced from inlet 17, is a second high pressure cold gas outlet 18 communicating with the interior of another cell 14. As shown in FIGURE 4, each inlet and outlet 17 and 18 and 21 and 22 may be provided with valve control edges schematically shown at 19 which are adjustable by means 20 to change the time of line-up between the communication of cell 14 and the various inlets and outlets such as 17. Thus, the time of the inlet 17 communicating with cell 14 may be advanced or retarded as well as the amount of time that inlet 17 is exposed to cell 14. Similarly located in the second stator 16 is a pair of peripherally spaced ports with a third high pressure hot gas inlet 21 and a fourth higher pressure hot gas exhaust outlet 22. By use of the structure shown in FIGURE 4, it can be seen that each inlet and outlet is peripherally adjustable relative to the rotor and to each of the other inlets and outlets.

In order to provide heat to the system, an external heat addition means 23, which may be any suitable heat source such as a combustion chamber which is supplied with fuel injection means 24 provided for the injection of fuel thereto. The external combustion chamber 23 is connected by suitable piping to the second high pressure outlet 18 and to the third high pressure inlet 21 to form a closed loop therewith. Since the gas in the connection between combustor 23 and inlet 21 is normally at a higher pressure and higher temperature, it is possible to use it as an energy source. To this end, a bleed 25 may be provided for using the excess energy prior to entry into the third inlet 21. This energy would otherwise be available at the fourth outlet 22. For cooling or other auxiliary purposes, gas may be extracted from the loop upstream of combustor 23.

In order to extract the energy available at the fourth exhaust outlet 22 from the wave engine, a turbine 26 or other pressure utilizing means may be placed downstream thereof and connected to the outlet 22. The turbine 26 or other power source drives the rotor 10 by a suitable connection 27 and the turbine exhausts through outlet 28, which may be a nozzle to atmosphere or a line to some other suitable device to use any remaining energy in the turbine exhaust.

From the description above, it can be seen that, upon rotation of rotor 10, each cell 14 is sequentially brought into registration with the various inlets and outlets described and the path of a typical charge of inlet gas will be apparent. From some suitable external source, cold low pressure inlet gas flows into cell 14 through first inlet 17 and, as the rotor turns, it passes out of the cell at second outlet 18, through the combustor 23, and into the other end of cell 14 at the third inlet 21. Upon further rotation, the gas exhausts from cell 14 at the fourth outlet 22 whereupon it is utilized by turbine 26. It will be appreciated that, because of the rotation of rotor 10, the gas sequentially enters different cells. For example, the gas exiting from second outlet 18 will subsequently enter a following cell 14 through third inlet 21. However, for purposes of explanation, it is easier to visualize the life of the gas within a single cell. The aims of the present invention are to obtain a net pressure rise from first inlet 17 to fourth outlet 22 and an essentially steady flow constant exhaust pressure from outlet 22.

These aims are achieved by the novel sequence or timing of operations as will now be explained. The sequence of operation can best be understood by reference to FIGURE 5 which represents the rotational movement of a single cell 14 on rotor 10. The cell is rotating in the direction shown by the arrow at the bottom of the figure. The various inlets and outlets are also shown at the sides of the cell with the same reference numerals appearing in FIGURE 2. Since the rotor is continually moving and the cells are constantly filling and emptying it will be convenient to start at the point where the cell exhausts out the fourth outlet 22 prior to which time it was filled with what is herein referred to as higher pressure hot exhaust gas. At the end of the cycle to be described, it will be apparent where this hot higher pressure exhaust gas appears.

Assuming that the cell is filled with such gas, it is first brought into communication with the fourth outlet 22 which opens to exhaust the gas from the cell. Immediately upon opening the cell to outlet 22 at point 29 a pressure wave in the form of an expansion wave 30 will be formed. The gas will start to move out the cell 14 in the direction shown by the arrows. The pressure wave 30 traverses the length of the cell, permitting the gases to rush out behind it, until it reaches the other end of the cell at which point it will reflect off the closed portion at 31 and continue back across the cell to point 32. The pressure within the cell will become equal to or less than the inlet pressure at 17 as the wave reflects at point 31. At point 31 the first low pressure cold gas inlet 17 is opened to the cell. Since the pressure within the cell at this point is equal to or less than the inlet pressure, cold gas flows into the cell as shown by the arrows. This gas forms an interface 33 with the hot gas in the cell. Thus, it can be seen that the exhaust outlet 22 is open prior to the inlet opening 17 by substantially the time it takes pressure wave 30 to travel across the cell from point 29 to point 31. In the meantime the hot gases continue to flow out fourth outlet 22 and the pressure wave reflects back across the cell from 31 to 32. During this period of time the discharge total pressure at 22 will be circumferentially uniform with steady flow from the machine. Outlet 22 is then closed substantially when the pressure wave has reflected back to 32. Thus it will be seen that the fourth outlet 22 is closed by substantially the time it takes pressure wave 30 to go from point 29, when it is generated, across the cell to point 31 and reflect back to point 32. This is twice the time it takes the pressure wave to traverse the cell. It is this timing sequence wherein the improvement of the present invention lies. Since the output of the cell is constant high pressure gas during the period of time it takes the pressure wave 30 to traverse the cell length twice, it is possible to capture this high pressure gas by closing the outlet 22 at this time and shutting off any further outflow of the hot high pressure exhaust gases from the cell. This results in incomplete scavenging of the cell which is not required in the instant invention.

Reference to FIGURE 3 will indicate what happens as just described. In this diagram the exhaust pressure in outlet 22 is plotted against the time after the outlet opening. It can be seen that, upon initial opening of outlet 22 at point 29, the outlet pressure shown by line 34 is high and constant. As the cell continues to exhaust, the pressure begins to drop at point 32 after the pressure wave 30 reflects back across the cell and it drops down as shown to level off as the cell is completely scavenged of the hot gases. The average pressure of this complete cycle when all the exhaust gases are scavenged from the cell is shown at line 35, which is only slightly above the lowest pressure. By chopping off the exhaust at point 32 it can be seen that only the high pressure part of line 34 is permitted to exhaust through outlet 22. This is considerably above the average pressure shown by line 35. The closing of the fourth outlet port 22 is substantially at point 32 although it may vary slightly even to the line 36. The term "substantially" is intended to cover this closing of the fourth outlet very close to point 32.

In the meantime, referring again to FIGURE 5, the inlet cold air is entering cell 14 through first inlet 17 and has formed interface 33 which moves across the cell. Closure of fourth outlet 22 at point 32, produces a compression wave which starts back across the cell as shown at line 37. This compression wave will stagnate the hot flow behind it as shown in the dotted portion 38. The wave continues on through the interface 33 essentially stagnating the cold gas behind it at 39 until it reaches the opposite end of the cell at point 40 at which time the first inlet is closed. When the compression wave 37 hits the interface 33 it is bent because of density differences and there is a reflected portion and a transmitted portion, the transmitted portion being that which is shown continuing to point 40, whereas the reflected portion is omitted for clarity. Suffice to say that the wave continues on through the interface essentially stagnating the flow of air behind it. From this it can be seen that the first inlet 17 is closed after the closure of fourth outlet 22 at the time it takes the pressure wave 37 to traverse the length of the cell after the fourth outlet closes at 32.

At this point it will be apparent that the cell under discussion contains a charge of cold gas on the left side and a residual charge of hot gas on the right side. Thus, at this point the cell is not completely scavenged nor is it intended that it should be.

In the meantime, prior to the closing of the first outlet at point 40 the third inlet 21, containing high pressure hot gas, is open at point 41. The opening of inlet 21 creates another pressure wave 42 which immediately traverses the length of the cell compressing the residual hot gas remaining in the cell and continuing through the interface 33, bent as before, and compresses the cold gas in the left hand side of the cell to a high pressure level and moves this gas toward the second outlet 18 as the compression wave 42 moves across the cell. When wave 42 reaches the opposite end of the cell at point 43 the second high pressure cold fluid outlet 18 is opened to draw off this cold high pressure gas. This outlet port 18 is left open until the interface 33 reaches the side of the cell again at point 44. At this point the second outlet 18 is closed and the cell is now charged with high pressure hot gas which came in from third inlet 21 which was the condition at which the description of this cycle was started.

At this point of the description, the third inlet 21 has not yet been described as closed. The point of closing of inlet 21 at point 45 is determined on a mass balance between the extraction of cold gas through outlet 18 and the addition of hot gas through inlet 21. In other words, the third inlet 21 is left open from 41 to 45 long enough to add the amount of mass of hot gas into the cell 14 to equal the mass of cold gas extracted from the cell through outlet 18. Thus, the third inlet 21 is closed at 45 at the time the mass of hot gas drawn into the cell through inlet 21 equals the mass of cold gas drawn out of the cell through outlet 18. It will be apparent that the position of the closure at point 45 may vary and, as shown, is as actually tested. Further, its position may depend on the pressure drop through the system and other external conditions. Thus, if the external pressure drop is high, it may be desirable to leave inlet 21 open longer than the indicated distance from 41 to 45 but, in any case, 45 will be closed before a pressure wave from point 43 can traverse the cell from left to right.

From the above description it should be apparent that there is a net pressure rise, as shown in FIGURE 3, between inlet 17 and outlet 22 as well as an essentially time steady pressure available at outlet 22. As previously pointed out, the net pressure rise contains energy which can be utilized by the turbine 26 downstream of outlet 22 and this is available even when the pressure at inlet 21 from the combustor 23 may be lower than that at outlet 18. Since the higher pressure is available at outlet 22 as well as a steady pressure, it is unnecessary to have additional extraneous equipment to use the bleed off at point 25 to further complicate the system. A small amount of power can be extracted from turbine 26 or obtained from other sources not shown to drive the rotor 10.

While I have hereinbefore described a preferred form of my invention, obviously variations of the present invention are possible in the light of the above teachings. It is therefore to be understood that within the scope of the appended claims, the invention may be practiced otherwise than as specifically described.

I claim:

1. A pressure exchanger comprising, a rotor having a plurality of axially extending cells therethrough, a first stator adjacent one end of the rotor and having a first low pressure cold fluid inlet and a second peripherally spaced high pressure cold fluid outlet adjacent said cells and communicating therewith, a second stator adjacent the other end of the rotor and having a third high pressure hot fluid inlet and a peripherally spaced fourth higher pressure hot fluid exhaust outlet, heat addition means external of the rotor and connected to said second outlet and third inlet to form a closed loop therewith, valve control edges on each inlet and outlet and peripherally spaced to open said first inlet to admit cold fluid sequentially to each cell while opening said fourth outlet of said cell for exhaust of higher pressure hot fluid at a point preceding said first inlet opening by substantially the time for a pressure wave to traverse the cell, then to close the fourth outlet at substantially twice the time it takes the pressure wave to traverse the cell length from the time it is generated by the opening of the fourth outlet to stop the exhaust before the cell is scavenged, then closing said first inlet after the closure of said fourth outlet at substantially the time the pressure wave traverses the cell after the fourth outlet closing, and opening the third inlet to the high pressure hot fluid and thereafter opening the second outlet to the exhaust of high pressure cold fluid at substantially the time it takes the pressure wave generated by the third inlet opening to traverse the cell, then closing the second outlet after the mass of high pressure cold fluid has been exhausted from the cell, and closing said third inlet at a point preceding the second outlet closing when the mass flow into said cell of high pressure hot fluid equals the withdrawal of the mass flow of high pressure cold fluid from said second outlet whereby a steady flow higher pressure is exhausted from said fourth outlet than enters said first inlet and compression is obtained in said cells by compression waves.

2. Apparatus as defined in claim 1 wherein said valve control edges have means to adjust them peripherally relative to said rotor and to each other.

3. A time steady pressure exchanger comprising, a rotor having a plurality of axially extending cells open at each end, a first stator adjacent one end of the rotor and having a first low pressure cold gas inlet and a second peripherally spaced high pressure cold gas outlet adjacent said cells and communicating therewith, a second stator adjacent the other end of the rotor and having a third high pressure hot gas inlet and a peripherally spaced higher fourth pressure hot gas exhaust outlet, a combustion chamber external of the rotor and connected to said second outlet and third inlet to form a closed loop therewith, fuel injection means connected to said combustion chamber, valve control edges on each inlet and outlet and peripherally spaced to open said first inlet to admit cold gas sequentially to each cell while opening said fourth outlet of said cell for exhaust of higher pressure hot gas at a point preceding said first inlet opening by substantially the time for a pressure wave to traverse the cell length, then to close the fourth outlet at substantially twice the time it takes the pressure wave to traverse the cell length from the time it is generated by the opening of the fourth outlet to stop the exhaust of higher pressure hot gas before the cell is scavenged, then closing said first inlet after the closure of said fourth outlet at substantially the time the same pressure wave again traverses the cell length after the fourth outlet closes, and opening the third inlet to the high pressure hot gas from the combustor prior to closure of the first inlet, and thereafter opening the second outlet to the exhaust of high pressure cold gas at substantially the time it takes the pressure wave generated by the third inlet opening to traverse the length of the cell, then closing the second outlet after a desired mass of high pressure cold gas has been exhausted from the cell to the combustion chamber, and closing said third inlet prior to the closing of said second outlet when the mass flow of high pressure hot gas from the combustion chamber into said cell equals the withdrawal of the mass flow from the second outlet, whereby a steady flow higher pressure gas is exhausted from said fourth outlet than enters said first inlet and compression is obtained in said cells, without complete scavenging, by compression waves.

References Cited in the file of this patent
UNITED STATES PATENTS

| | | |
|---|---|---|
| 2,399,394 | Seippel | Apr. 30, 1946 |
| 2,461,186 | Seippel | Feb. 8, 1949 |
| 2,738,123 | Hussmann | Mar. 13, 1956 |
| 2,867,981 | Berchtold | Jan. 13, 1959 |
| 2,901,163 | Waleffe | Aug. 25, 1959 |
| 2,970,745 | Berchtold | Feb. 7, 1961 |